3,265,751
INHIBITING POPCORN POLYMER FORMATION
George McCoy, Malvern, Alfred Case Whiton, Blue Bell, and Paul Gordon Haines, Lafayette Hill, Pa., assignors to Pennsalt Chemicals Corporation, Philadelphia, Pa., a corporation of Pennsylvania
No Drawing. Filed Dec. 17, 1964, Ser. No. 419,199
4 Claims. (Cl. 260—666.5)

This invention relates to the inhibition of the undesirable polymerization of olefinic monomers which give rise to popcorn polymers. The invention is particularly concerned with the use of N-hydroxymorpholine and N-hydroxypiperidine as popcorn polymer inhibitors in processes relating to the preparation of synthetic rubber.

U.S. 3,148,225 which issued September 8, 1964, discloses the use of N,N-dialkylhydroxylamines as popcorn polymer inhibitors. It has now been found, however, that N-hydroxymorpholine and N1hydroxypiperidine are surprisingly superior to the N,N-dialkylhydroxylamines and may be used to inhibit popcorn polymer formation with an effectiveness not heretofore obtained.

Thus, in accord with the invention, the formation of popcorn polymers in olefin monomer recovery systems may be retarded by the process comprising the contacting of said monomer with an inhibiting amount of a compound selected from the group consisting of N-hydroxymorpholine and N-hydroxypiperidine.

The general conditions under which the olefin monomers are contacted with the inhibitors in accord with this invention will be those procedures set forth in U.S. 3,148,225 referred to above. Likewise, the olefin monomer recovery systems which are subject to the treatment in accordance with this invention will be those systems where polymers and copolymers are obtained from ethylenically unsaturated monomers, and will include those systems described in U.S. 3,148,225.

Preferably, the invention will be used to prevent popcorn polymer formation in butadiene based systems such as styrene-butadiene systems used for the manufacture of synthetic rubber and the invention will be illustrated by examples referring to this system. The concentartion at which the inhibitor will be used will usually range from 0.001 to about 5.0% by weight of the total monomers; i.e. from about 10 to 50,000 parts per million parts of monomer. At concentrations below this value the inhibiting effects are too small to be of significant value. On the other hand, greater amounts may be used say up to 20% but such large amounts are not required and are simply wasteful.

In order to further illustrate the invention the following example is given:

EXAMPLE 1

The procedure for evaluating the effectiveness of the popcorn polymer inhibitors of this invention is similar to that disclosed in U.S. 3,148,225 except that the popcorn polymer seed is activated prior to introduction into the atmosphere where popcorn polymer formation can occur. This activation is carried out by exposing the popcorn polymer seed to a 100 watt incandescent lamp for about 12 hours prior to its introduction into the polymerization atmosphere.

The technique in detail is as follows:

Bottles are flushed with nitrogen and then charged with 30 milliliters of inhibitor free styrene, 0.5 g. of popcorn polymer "seed" and the material to be tested as the popcorn inhibitor. The "seed" is that taken from a styrene-butadiene rubber flash tank and it is activated just before use by exposing it overnight to a 100 watt incandescent lamp. The bottles are then capped and 1 milliliter of butadiene is injected into each bottle with a hypodermic syringe through a self sealing synthetic rubber cap liner. The bottles are then placed in a constant temperature oven at 140° F. and are inspected periodically for the appearance of popcorn polymer. After popcorn growth starts in each bottle it usually proceeds rapidly filling the free space in the bottle nearly full within hours with a white insoluble polymer having the appearance of popcron.

The following table indicates the test conditions and the results obtained:

Table 1
EFFECT OF POPCORN POLYMER INHIBITORS EVALUATED AT 140° F.

| Inhibitor | Time required to observe popping |
|---|---|
| None, hrs. | 8 to 10 |
| 0.05% diethylhydroxylamine, days | 12 |
| 0.05% N-hydroxymorpholine, days | 22 |

It will be observed from the above table that the use of N-hydroxymorpholine as a popcorn polymer inhibitor is vastly superior to diethylhydroxylamine.

In a similar test employing N-hydroxypiperidine at 0.05% concentration popcorn polymer was inhibited for 25 days although there was some slight, non-increasing growth after four days. In the same test run, a control with no inhibitor showed complete popcorn polymer growth after 12 hours.

Inhibition tests were also carried out in the vapor phase. In these tests, the procedure outlined above was followed except that the seeds were suspended about three inches above the liquid monomer. Under such test condition N-hydroxymorpholine at 0.1% concentration inhibited popcorn formation for 13 days. Under control conditions without inhibitor in these tests popcorn growth occurred in two days and with N,N-diethylhydroxylamine at 0.1% in the same test run vapor phase inhibition lasted for only 7 days.

It will be understood that numerous changes and variations may be made from the above description of the invention and the examples without departing from the spirit and scope of the invention.

We claim:
1. The process of inhibiting the formation of popcorn polymers in olefin monomer recovery systems which comprises contacting said monomer with an inhibiting amount of a compound selected from the group consisting of N-hydroxymorpholine and N-hydroxypiperidine.
2. The process of inhibiting popcorn polymer formation from monomers used in the preparation of a styrene and butadiene copolymer which comprises contacting said monomers with from about 0.001% to about 5% by weight of the monomer of a compound selected from the group consisting of N-hydroxymorpholine and N-hydroxypiperidine.
3. The process of inhibiting popcorn polymer formation from monomers used in the preparation of a styrene-butadine elastomer which comprises contacting said monomers with about 0.001% to about 5% by weight of said monomer with N-hydroxymorpholine.
4. The process of inhibiting popcorn polymer formation from monomers used in the preparation of a styrene-butadiene elastomer which comprises contacting said monomers with about 0.001% to about 5% by weight of said monomer with N-hydroxypiperidine.

References Cited by the Examiner
UNITED STATES PATENTS
3,148,225   9/1964   Albert _____ 260—666.5 X DELBERT E. GANTZ, Primary Examiner.
G. E. SCHMITKONS, Assistant Examiner.